Figure 1:
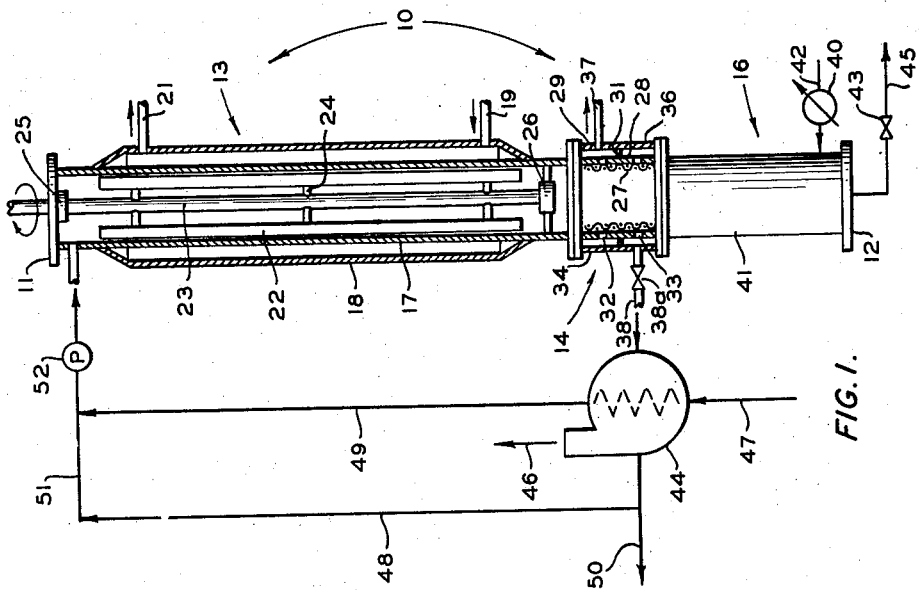

April 14, 1959  G. H. DALE  2,882,215
FRACTIONAL CRYSTALLIZATION PROCESS
Filed Nov. 27, 1953

INVENTOR.
G. H. DALE
BY
ATTORNEYS

{ # United States Patent Office 2,882,215
Patented Apr. 14, 1959

2,882,215

FRACTIONAL CRYSTALLIZATION PROCESS

Glenn H. Dale, Bartlesville, Okla., assignor to Phillips Petroleum Company, a corporation of Delaware Application November 27, 1953, Serial No. 394,678

17 Claims. (Cl. 208—31)

This invention relates to the separation and purification of components of a liquid multi-component mixture. In a more specific aspect, it relates to the separation of the components of a liquid mixture according to their freezing points. In one of its more specific aspects, it relates to the separation and purification of a hydrocarbon from a mixture containing other hydrocarbons. In still another of its more specific aspects, it relates to a process for the separation and purification of materials which form waxy crystals. In yet another of its more specific aspects, it relates to a process which utilizes a low boiling liquid solvent to aid the natural reflux liquid in removing occluded impurities from crystals.

In the separation of multi-component mixtures by crystallization methods, it is theoretically possible to obtain at least one of the components in substantially pure form in a single stage of operation. Accordingly, while distillation and solvent extraction methods of separation in theory would require infinite stages for a pure product, only one stage of crystallization should be required since crystals separating from a solution are presumed to have a definite composition. In actual practice, however, it has been found that the crystals obtained from a solution of several components are impure because of the occlusion of mother liquor within the crystal interstices.

The amount of mother liquor occluded or entrapped by the crystals formed is ordinarily so great that it is necessary to provide some method for the removal of the occluded impurities if a high purity product is to be obtained in a single crystallization stage. A continuous method for the separation and purification of liquid multi-component mixtures has been recently disclosed by J. Schmidt in U.S. Patent No. 2,617,274, which utilizes a displaced reflux liquid to wash occluded impurities from the crystals in order to obtain a high purity product. This method involves cooling a liquid multi-component mixture from which the separation is to be made so as to form crystals of at least the higher melting component and thereafter separating the crystals from the mother liquor. The crystals are then introduced into a purification zone, in one end of which a melting zone is maintained and are moved as a compact mass toward the melting zone where at least a portion of the crystals is melted. A portion of the melt is withdrawn as product while at least a part of the melt is displaced countercurrently to the movement of crystals and in intimate contact therewith so as to remove therefrom the occluded impurities. It has also been recently disclosed by J. A. Weedman in copending U.S. application Serial No. 392,279, filed November 16, 1953, now Patent No. 2,813,099, that it may be advantageous and desirable to introduce a solvent into the melting zone of the purification zone in order to lower the viscosity and density of the liquid phase. In accordance with this invention, a low boiling solvent is utilized to aid the natural reflux in removing occluded impurities from the crystals, the solvent being supplied to the purification zone at a temperature sufficiently high to melt at least a portion of the crystals. By vacuum flashing or evaporating the solvent from the reflux liquid and passing the feed mixture in indirect heat exchange relation therewith, it is possible to materially reduce the refrigeration requirements of the fractional crystallization system.

The objects of this invention will be attained by the various aspects of the invention.

It is an object of the present invention to provide a process for the separation and purification of multi-component mixtures by fractional crystallization.

Another object of the invention is to provide apparatus for the separation and purification of multi-component mixtures by fractional crystallization.

Still another object of the invention is to provide a process for the separation and purification of a hydrocarbon from a mixture containing other hydrocarbons.

A further object of the invention is to provide an improved process for the separation and purification of materials which form waxy crystals.

A still further object of the invention is to provide a separation and purification process wherein a low boiling solvent is introduced as a liquid into a crystal purification zone in order to melt at least a portion of the crystals and aid the natural reflux in removing occluded impurities from the crystals.

Yet another object of the invention is to provide a separation and purification process which utilizes a displaced reflux liquid comprising crystal melt and a low boiling liquid solvent wherein the solvent is evaporated or vacuum flashed from the reflux liquid in order to cool that liquid and a multi-component feed mixture passed in indirect heat exchange relation therewith.

Still another object of the invention is to provide a separation and purification process utilizing a displaced reflux liquid comprising crystal melt and a low boiling liquid solvent wherein the reflux liquid is mixed with a multi-component feed mixture, and the solvent is evaporated or vacuum flashed therefrom so as to form crystals of the component having the highest melting point.

Still other objects and advantages will become apparent to those skilled in the art from the following disclosure.

Broadly speaking, the present invention is in a process for separating a component from a liquid multi-component mixture wherein a low boiling solvent is introduced into a melting zone preferably disposed in the downstream end, with respect to crystal movement, of a crystal purification column at a temperature sufficiently high to melt at least a portion of the crystals in said melting zone. It is to be understood, however, that the melting zone can be located in other portions of the purification column, e.g., an intermediate portion. At least a portion of the resulting liquid comprising crystal melt and solvent is passed as a reflux stream through the crystal purification column countercurrently to crystal movement therein, and subsequently recovered from the column and passed to a heat exchanger where the solvent is evaporated or vacuum flashed therefrom, thereby lowering the temperature of the reflux liquid. The multi-component feed mixture is passed through the heat exchanger in indirect heat exchange relationship with the reflux liquid, and the cooled feed mixture and reflux liquid, free from solvent, are then passed into a cooling zone where crystals of the component having the highest melting point are formed prior to introduction into the purification column. It is also within the scope of the invention to pass both the feed mixture and reflux liquid containing solvent into a cooling zone. By allowing the low boiling solvent to evaporate, the liquid in the cooling zone is cooled to a temperature sufficiently low to freeze out higher melting component crystals. The resulting crystal slurry is then introduced directly into the purification column. A product, containing solvent and in the form of melt or a mixture of melt and crystals, is recovered from the melting zone.

The process of this invention is applicable to a large number of simple binary and complex multi-component systems. The invention is particularly applicable to the separation and purification of materials which form soft waxy type crystals which are difficult to separate from the mother liquor. The normal paraffins in admixture with other hydrocarbons are examples of materials which form such crystals. Another application of the present invention is in the dewaxing of petroleum oils where the separation of waxes therefrom by distillation is practically impossible since the boiling ranges of the waxes and oils are very close. While the present invention is especially applicable to the purification of the materials which form waxy type crystals, it is to be understood that the process can be utilized in effecting the separation and purification of other systems, including both organic and inorganic mixtures.

In carrying out the process of this invention, the solvent utilized should have a low viscosity, a low density and a low freezing point and should be easily separable from the desired product. Examples of low boiling solvents which can be employed include hydrocarbons such as ethane, propane, butane, pentane and hexane and compounds such as acetone, ether, sulfur dioxide, methyl amine, ammonia, and similar low boiling materials. Preferably the solvent is miscible in the liquid formed by melting crystals in the melting zone of the purification column, but it is within the scope of the invention to use solvents which are only partly miscible or even immiscible in the crystal melt. It is also within the contemplation of the invention to use a low boiling compound which is a selective solvent for the impurities present on the surface of the crystals and within the crystal interstices. In this respect, in the separation of wax from waxy oils, it is preferred to use a hydrocarbon such as propane, which is a solvent for the oil. In choosing a solvent, however, one should not be selected which will react with the material being separated.

Three primary functions are performed by the solvent in carrying out the process of this invention. Firstly, the solvent furnishes the heat necessary to maintain a melting zone in the purification column, and accordingly the solvent is introduced into the column at a temperature sufficiently high to melt at least a portion of the crystals. Secondly, the solvent serves to lower the viscosity and density of the crystal melt and thereby provides a more fluid system. The amount of solvent used and the temperature at which it is introduced will depend on the system and the particular type of equipment used. While large amounts of solvents are advantageous from the standpoint of density and viscosity, the solvent reduces the temperature required to obtain the same percentage of solids at equilibrium. It is pointed out, however, that in some solid-liquid systems where mass transfer is slow, relatively large amounts of solvent can be used without reducing the temperature because non-equilibrium conditions exist. In any particular system, therefore, there will be an optimum amount of solvent necessary to lower the viscosity and density of the crystal melt without materially reducing the temperature required to crystallize a high percentage of higher melting component crystals from the multi-component feed mixture. A further factor to be considered in determining the amount of solvent to use is the degree of purity desired. Generally, the amount of solvent utilized will vary from about 1 to about 25 percent of the volume of solids moving through the purification column. Thirdly, the solvent aids the natural reflux, i.e., that portion of the crystal melt displaced countercurrently to crystal flow, in washing mother liquor from the surface of the crystals and from the crystal interstices. By using a low boiling solvent, the solvent can be evaporated or vacuum flashed from the reflux liquid subsequent to removal from the purification column so as to lower the temperature of this liquid prior to recycling to the chiller. Furthermore, the temperature of the feed mixture prior to introduction into the chiller can be lowered by passing the feed in indirect heat exchange relation with reflux liquid during the evaporation of the solvent. By operating in this manner, the refrigeration requirements of the separation and purification process are materially reduced.

Figure 2:
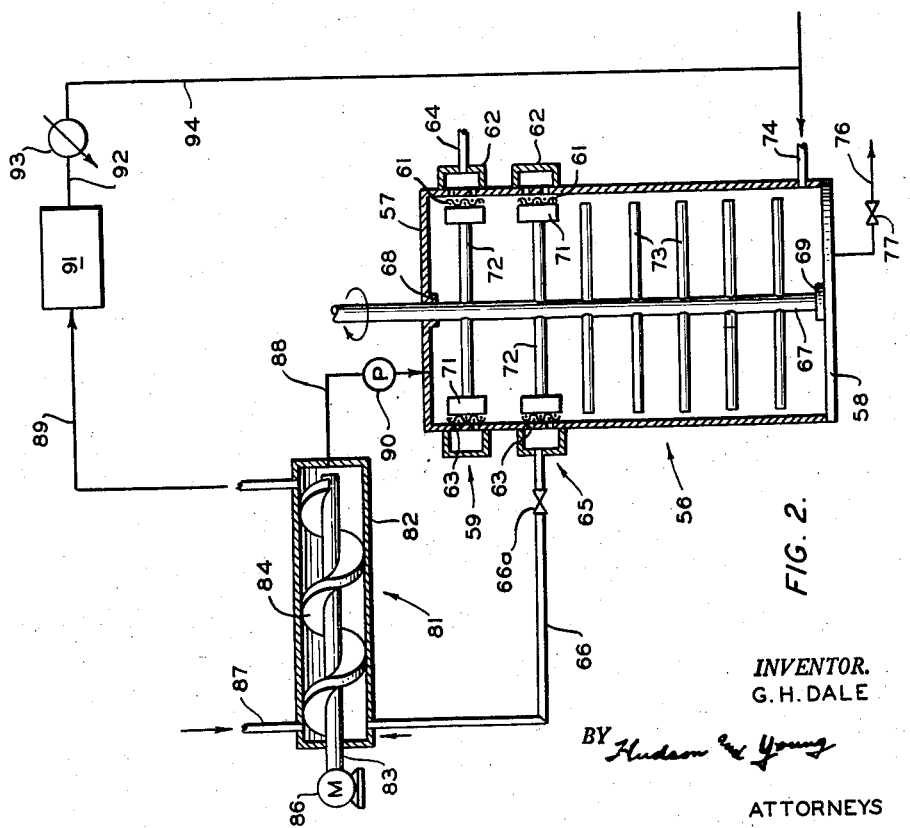

For a more complete understanding of the invention, reference may be had to the drawing in which:

Figure 1 is a diagrammatic elevation, partly in section, of an arrangement of apparatus suitable for carrying out the process of this invention; and Figure 2 is a diagrammatic elevation, partly in section, of a modification of the apparatus of the invention.

Referring now to Figure 1 of the drawing, an upright elongated column 10 is provided with upper and lower closure members 11 and 12, respectively, and is divided into three principal sections, namely, a scraped surface chiller 13, a filter section 14, and a crystal purification column 16. Scraped surface chiller 13 comprises a tubular member 17 provided with refrigeration means such as an annular jacket 18 which is provided with refrigeration inlet line 19 and refrigerant outlet line 21 whereby refrigerant is introduced into and withdrawn from the annular space between tubular member 17 and jacket 18. A plurality of scraper blades 22 are attached to vertical shaft 23 by a series of cross members 24. Shaft 23 is supported within tubular member 17 by means of upper and lower bearings 25 and 26, respectively. Cross members 24 and lower bearing 26 are constructed so as not to impede the flow of liquid and crystals through the chiller and may be in the form of a spider. Shaft 23 extends through upper closure member 11 and is operatively connected to a motor, not shown, thereby providing means for rotating the scraper blades.

Filter section 14, disposed immediately below scraped surface chiller 13 and connected thereto, comprises a filter screen 27, substantially cylindrical in shape, positioned within tube 28 which in turn is surrounded by jacket 34. Filter screen 27 is preferably made of wire screening of a fineness of 30 to 150 mesh so as to permit liquid to pass therethrough while retaining the crystals in the column. The annular section between tube 28 and jacket 29 is divided into an upper and lower section by ring member 31. Tube 28 is perforated as by an upper row of holes 32 and a lower row of holes 33, the holes being spaced around the circumference of the tube near its bottom and top. By this arrangement of elements as described, filter section 14 is in effect divided into upper and lower filters 34 and 36, respectively. Line 37 provides means for withdrawing lower melting product or mother liquor from upper filter 34 while line 38 connects with lower filter 36 for withdrawal of the reflux stream. It is also within the scope of the invention to provide a single filter in which case both the mother liquor and the reflux liquid are withdrawn through the same line.

Crystal purification column 16 is connected to filter section 14 and comprises substantially vertical tube 41 closed at its lower end by closure member 12. Line 42 communicates with the lower end of purification column 16 and provides means for introducing solvent into the column. A heat exchange means 40 is provided in line 42 in order to control the temperature of the solvent charged to the column. Outlet line 45 containing valve 43 is connected to the lower end of column 16 for withdrawal of higher melting product from the column.

Line 38 containing valve 38a is connected to heat exchanger 44 wherein the low boiling solvent is evaporated from the reflux liquid. Line 46 provides means for withdrawing the evaporated solvent from the heat exchanger and is connected to a compression system, not shown, for liquefaction of the solvent vapor. Line 47, connected to a source of feed material, passes through heat exchanger 44, thereby providing means for precooling the feed mixture. Lines 48 and 49, connected to heat exchanger 44, provide means for withdrawing reflux liquid free from solvent and feed mixture, respectively, from the heat exchanger. Lines 48 and 49 lead to line 51 containing pump 52 and connected to scraped surface chiller 13. Line 50 provides means for withdrawing from the system reflux liquid which it is not desired to recycle to the chiller.

In a modification of the apparatus of the invention as shown in Figure 2, crystal purification column 56 is provided with upper and lower closure members 57 and 58, respectively. Filter section 59 disposed in the upper portion of column 56 for separation of mother liquor comprises a filter screen 61, substantially cylindrical in shape, positioned within the column which in turn is surrounded by jacket 62. Crystal purification column 56 is perforated as by holes 63, thus permitting passage of fluid from the crystal mass through the filter screen and walls of the column without permitting the crystals to flow therethrough. Line 64 is connected to jacket 62 in order to provide means for withdrawing mother liquor from the crystal purification column. Filter section 65 positioned below filter section 59 is similar in construction to the latter filter and corresponding elements have been designated with identical reference numerals. Line 66 containing valve 66a is connected to jacket 62 of filter section 65 for withdrawal of reflux liquid from the column. A shaft 67 centrally positioned within column 56 is supported by means of upper and lower bearings 68 and 69, respectively. Scraper blades 71 attached to shaft 67 by arms 72 are positioned in close proximity to filter screens 61. A plurality of stirring means such as radial blades or rods 73 are affixed to shaft 67 at spaced intervals. Scraper blades 71 and stirrer rods 73 turn with shaft 67 when the shaft is rotated by a motor, not shown. Line 74 attached to the lower end portion of crystal purification column 56 provides means for introducing solvent into that end of the column while line 76 containing valve 77 is connected to lower closure member 58 for withdrawal of product from the column.

Chiller 81 comprises tubular member 82 containing an axially disposed shaft 83 having mounted thereon a helix or screw 84. The screw or helix 84 is actuated by motor 86 operatively connected to the outer end of shaft 83. Line 66 connected to tubular member 82 provides means for introducing reflux liquid thereinto while the feed mixture is passed into that same member through line 87. The discharge end of chiller 81 is connected to the top portion of crystal purification column 56 by means of conduit 88 which contains a pump 90 of a type capable of handling solids. A Moyno pump as manufactured by Robbins and Myers, Inc., Springfield, Ohio, a gear pump, or a diaphragm pump are examples of pumps capable of handling solids which can be advantageously employed. A filtering means can also be provided in conduit 88 in order to control the concentration of the slurry to be introduced into the crystal purification column.

Line 89 connected to chiller 81 provides means for withdrawing vaporized solvent from the chiller and is connected to compressor 91. Line 92 connects compressor 91 to condenser 93 while line 94 leads from the outlet of condenser 93 to solvent inlet line 74.

While the fractional crystallization apparatus of Figures 1 and 2 have been described with a certain degree of particularity, it is not intended to limit the instant invention to the particular apparatus described. Accordingly, it is within the scope of the invention to adapt other types of fractional crystallization apparatus for use in the process of this invention, e.g., those disclosed by D. L. McKay in copending U.S. application, Serial No. 375,850, filed August 24, 1953, and by J. A. Weedman in co-pending U.S. application, Serial No. 166,992, filed June 9, 1950, now Patent No. 2,747,001. Furthermore, while the crystal purification columns of Figures 1 and 2 have been illustrated and described as occupying a substantially vertical position, it is to be understood that by using a crystal mover such as an auger or piston the purification columns can be operated in other positions, e.g., a horizontal position. It is to be understood also that the filter scrapers and crystal stirrers of Figure 2 can be utilized with the purification column of Figure 1 and that the chiller can be attached directly to the purification column as shown in Figure 1 or separated from that column as illustrated in Figure 2.

In the operation of the apparatus of Figure 1, a feed mixture, which may be a liquid multi-component mixture, one component of which crystallizes first upon lowering the temperature of the mixture so as to form crystals contaminated with at least one other component, is introduced through line 51 into scraped surface chiller 13. Refrigerant is passed into the annular space between tubular member 17 and annular jacket 18 through line 19 and withdrawn therefrom through line 21 at a rate sufficient to maintain scraped surface chiller 13 at a temperature low enough to crystallize one of the components. The feed mixture fills the entire length of elongated column 10, and a superatmospheric pressure is maintained at the top of chiller 13 through the operation of pump 52. Because of the low chiller temperature, crystals of one component are frozen out, thereby forming a slurry of crystals and mother liquor. Scraper blades 22 are slowly rotated with shaft 23 in order to remove any crystals forming on the walls of tubular member 17. The slurry of mother liquor and crystals flows downwardly through chiller 13 and enters filter section 14 where the crystals are separated from the mother liquor or lower melting product by removal of the liquid from upper filter 34 through line 37. The crystals, together with occluded impurities, then enter crystal purification column 16, displacing the liquid therein and forming a uniform, compact mass of crystals. A low boiling solvent is introduced into the lower end of crystal purification column 16 through line 42 after passing through heater 40 where it is heated to a temperature sufficiently high to melt at least a portion of the crystals. It is also within the contemplation of the invention to dispose a heat exchange means in the lower end of the crystal purification column in order to provide means for melting crystals therein. When operating in this manner, heater 40 can be eliminated from the system. The mass of crystals is moved downwardly through column 16 towards the high temperature section by the combination of the force of gravity and the hydraulic force exerted by the feed mixture entering the top of column 10. On reaching the high temperature section of column 16, at least a portion of the crystals is melted, and a part of the resulting melt dissolved in solvent is displaced upwardly as a reflux stream through the downwardly moving mass of crystals and in intimate contact therewith. A product, containing solvent and in the form of melt or a mixture of melt and crystals, is removed from the lower end of column 16 through line 45 and thereafter passed to a distillation system, not shown, for removal of the solvent from the product.

The reflux stream comprising crystal melt and solvent passes counter-currently to the movement of crystals through the combined effect of withdrawing only a portion of the liquid from the purification column and the liquid displacing action of the uniform, contiguous mass of crystals moving through the column. By utilizing a solvent which is miscible in the crystal melt, the viscosity and density of the crystal melt is lowered, thereby making the system more fluid. By operating in this manner, more efficient contact between the reflux stream and the moving mass of crystals is made possible, thus increasing the washing action of the reflux liquid.

The reflux stream is removed from lower filter section 36 through line 38 and thereafter passed to heat exchanger 44. In heat exchanger 44, which can be operated under a vacuum, the solvent is flashed or evaporated from the reflux liquid and thereafter removed through line 46. The gaseous solvent can then be sent to a compression system, not shown, for liquefaction and subsequent recycling as a liquid to line 42 for introduction into the crystal purification column. The temperature of the reflux liquid is lowered by the evaporation of the solvent therefrom. A feed mixture introduced into heat exchanger 44 through line 47 passes therethrough in indirect heat exchange relationship with the reflux liquid, thus materially lowering the temperature of the feed mixture. Reflux liquid, free from solvent, and feed mixture leave heat exchanger 44 through lines 48 and 49, respectively, and pass into line 51. In case it is not desired to recycle the reflux liquid, any part or all of this liquid can be removed from the system through line 50. The reflux liquid and feed mixture are mixed in line 51 and then introduced into scraped surface chiller 13 under pressure developed by pump 52. It is also within the scope of the present invention to evaporate only a portion of the solvent from the reflux liquid. Partial evaporation only of the solvent may become necessary if the reflux liquid is cooled sufficiently to form crystals in order to maintain a slurry which will flow freely through line 48.

In the practice of the process of this invention utilizing the apparatus of Figure 2, a slurry of crystals and mother liquor is pumped by pump 90 through conduit 88 into the upper portion of crystal purification column 56. The crystal slurry passes downwardly through the column and enters filter section 59 wherein the mother liquor is separated from the crystals and withdrawn from the column through line 64. The mass of crystals formed by removal of mother liquor is moved downwardly through column 56 toward the high temperature section of that column by the combination of the force of gravity and the hydraulic force exerted by the crystal slurry entering the top of the column. A low boiling solvent is introduced into the lower end of column 56 through line 74 at a temperature sufficiently high to melt at least a portion of the crystals. On reaching the high temperature section of column 56, at least a portion of the crystals is melted, and a part of the resulting melt dissolved in solvent is displaced upwardly as a reflux stream through the downwardly moving mass of crystals and in intimate contact therewith. A product, containing solvent and in the form of melt or a mixture of melt and crystals, is removed from the lower end of column 56 through line 76 and thereafter passed to distillation system, not shown, for removal of the solvent from the product.

The reflux stream comprising melt and solvent passes countercurrently to the movement of crystals through the combined effect of withdrawing only a portion of the liquid from the purification column and the liquid displacing action of the mass of crystals moving through the column. The reflux stream is separated from the crystal mass in filter section 65 and removed from the column through line 66. During the above-described operation, scraper blades 71 are slowly rotated with shaft 67, thereby preventing the clogging of the filter screens of filter sections 59 and 65 with crystals. Furthermore, stirrer rods 73 turning with shaft 67 continuously stir the crystals, thereby maintaining them as a uniform, compact mass so that channeling of the reflux stream in its passage through the crystals is prevented.

The reflux stream containing solvent is introduced into chiller 81 through line 66 where it is mixed with the feed mixture being passed into the chiller through line 87. The liquid within chiller 81 is cooled to a temperature sufficiently low to crystallize higher melting component crystals by allowing the low boiling solvent to vaporize under reduced pressure through line 89. The crystal slurry formed in the chiller is discharged therefrom through the operation of auger 84 into conduit 88 and pumped into the top of crystal purification column 56 as previously described.

The vaporized solvent is passed by means of line 89 into compressor 91 where the gas is compressed and thereafter introduced into condenser 93 through line 92 where it is liquefied. The condensed solvent is then recycled to line 74 through line 94. By controlling the operating conditions of compressor 91 and condenser 93, the temperature of the solvent can be regulated so that it is at a temperature sufficiently high to melt at least a portion of the crystals when it is introduced into the lower end of the crystal purification column. It is also within the scope of the invention to dispose a heat exchange means in the lower end of column 56 in order to provide means for melting crystals therein.

It will be evident that by utilizing a low boiling solvent in carrying out my fractional crystallization process, I have provided a method which is especially adapted for the purification of materials which form soft waxy type crystals. By using such a solvent, it is possible to precool the feed mixture and reflux liquid prior to introduction into the scraped surface chiller. By operating in this manner, the heat transfer necessary to form crystals within the chiller is decreased, thereby materially reducing the refrigeration requirements of the fractional crystallization apparatus.

As will be evident to those skilled in the art, various modifications of this invention can be made or followed in the light of the foregoing disclosure and discussion without departing from the spirit or scope of the invention.

I claim:

1. A process for separating a component from a liquid multi-component mixture which comprises moving a uniform compact mass of crystals essentially of said component, formed by said component upon cooling said mixture, downstream through a purification zone to a melting zone therein; passing a low boiling solvent into said melting zone in said purification zone at a temperature sufficient to melt at least a portion of said crystals therein; melting at least a portion of said crystals in said melting zone; passing at least a portion of the resulting liquid comprising melted crystals and solvent as a reflux liquid countercurrently through said moving mass of crystals; withdrawing reflux liquid from said purification zone upstream of said melting zone; passing said reflux liquid into a heat exchange zone; evaporating solvent from said reflux liquid in said heat exchange zone, thereby lowering the temperature of said liquid; passing said mixture through said heat exchange zone in indirect heat exchange relation with said reflux liquid; and recovering a product comprising said component containing solvent from the downstream end crystalwise of said purification zone.

2. The process of claim 1 in which said low boiling solvent is butane.

3. The process of claim 1 in which said low boiling solvent is pentane.

4. The process of claim 1 in which said low boiling solvent is sulfur dioxide.

5. A continuous process for separating a crystallizable component from a liquid multi-component feed mixture which comprises cooling said feed mixture in a cooling zone so as to crystallize essentially said component; separating crystals from lower melting components of said mixture in a first filter zone; passing said crystals into a purification zone so as to form a mass of crystals therein; passing said crystals through said purification zone into a melting zone therein; passing a low boiling solvent into said melting zone, said solvent being at a temperature sufficiently high to melt at least a portion of said crystals; melting at least a portion of said crystals in said melting zone; passing at least a portion of the resulting liquid comprising melted crystals and solvent as a reflux liquid countercurrently through said moving mass of crystals; withdrawing reflux liquid from a second filter zone disposed in said purification zone downstream crystalwise from said first filter zone; passing said reflux liquid into a heat exchange zone; evaporating solvent from said reflux liquid in said heat exchange zone, thereby lowering the temperature of said liquid; passing said feed mixture through said heat exchange zone in indirect heat exchange relation with said reflux liquid; introducing said feed mixture into said cooling zone; and recovering a product comprising said component containing solvent from the downstream end crystalwise of said purification zone.

6. The process of claim 5 wherein reflux liquid substantially free from solvent is recycled to said cooling zone from said heat exchange zone.

7. A continuous process for separating a component from a liquid multi-component mixture, said component forming crystals upon the cooling of said mixture, which comprises cooling said mixture in a cooling zone to a temperature such as to form a slurry of crystals essentially of said component and mother liquor; separating said crystals from said slurry by passing mother liquor through a first filter; continuously scraping said first filter so as to allow free passage of mother liquor therethrough; passing said crystals into a purification zone so as to form a uniform, compact mass of crystals therein; slowly and continuously stirring said mass of crystals; moving said mass of crystals through said purification zone into a melting zone therein; passing a low boiling solvent into said melting zone, said solvent being at a temperature sufficiently high to melt at least a portion of said crystals; melting at least a portion of said crystals in said melting zone; passing a portion of the resulting liquid comprising melted crystals and solvent as reflux liquid countercurrently through said moving mass of crystals so as to intimately contact said crystals; withdrawing said reflux liquid through a second filter disposed downstream crystalwise from said filter filter; continuously scraping said second filter so as to allow free passage of said reflux liquid therethrough; passing said reflux liquid into a heat exchange zone; evaporating solvent from said reflux liquid in said heat exchange zone, thereby lowering the temperature of said reflux liquid; passing said mixture through said heat exchange zone in indirect heat exchange relation with said reflux liquid; introducing said mixture into said cooling zone; and recovering a product comprising said component containing solvent from the downstream end crystalwise of said purification zone.

8. The process of claim 7 wherein reflux liquid substantially free from solvent is recycled from said heat exchange zone to said cooling zone.

9. A continuous process for separating a component from a liquid multi-component mixture, said component forming crystals upon the cooling of said mixture, which comprises passing a slurry of crystals essentially of said component and mother liquor from a cooling zone into a purification zone; separating said crystals from said slurry in a first filter zone so as to form a mass of crystals within said purification zone; moving said mass of crystals through said purification zone into a melting zone therein; passing a low boiling solvent into said melting zone, said solvent being at a temperature high enough to melt at least a portion of said crystals; melting at least a portion of said crystals in said melting zone; passing at least a portion of the resulting liquid comprising melted crystals and solvent as a reflux stream countercurrently through said moving mass of crystals; withdrawing reflux liquid containing solvent from a second filter zone disposed in said purification zone downstream crystalwise from said first filter zone; passing said reflux liquid containing solvent into said cooling zone; passing feed mixture into said cooling zone; evaporating solvent from the resulting mixture comprising feed mixture and reflux liquid, thereby lowering the temperature of said resulting mixture and crystallizing said component; and recovering a product comprising said component containing solvent from the downstream end crystalwise of said purification zone.

10. The process of claim 9 wherein the evaporated solvent is liquefied and then recycled to said melting zone.

11. A continuous process for separating a component from a liquid multi-component mixture, said component forming crystals upon the cooling of said mixture, which comprises passing a slurry of crystals essentially of said component and mother liquor from a cooling zone into a purification zone; separating said crystals from said slurry by passing mother liquor through a first filter; continuously scraping said first filter so as to allow free passage of mother liquor therethrough; moving the resulting mass of crystals through said purification zone into a melting zone therein; slowly and continuously stirring said mass of crystals; passing a low boiling solvent into said melting zone, said solvent being at a temperature high enough to melt at least a portion of said crystals in said melting zone; melting at least a portion of said crystals in said melting zone; passing at least a portion of the resulting liquid comprising melted crystals and solvent as a reflux stream countercurrently through said moving mass of crystals; withdrawing reflux liquid containing solvent through a second filter disposed downstream from said first filter; continuously scraping said second filter so as to allow free passage of said reflux liquid therethrough; passing said reflux liquid containing solvent into a cooling zone; passing feed mixture into said cooling zone; evaporating solvent from the resulting mixture comprising feed mixture and reflux liquid, thereby lowering the temperature of said resulting mixture and crystallizing said component; and recovering a product comprising said component containing solvent from the downstream end crystalwise of said purification zone.

12. The process of claim 11 wherein the evaporated solvent is liquefied and then recycled to said melting zone.

13. A process for the separation and purification of wax-oil mixtures which comprises cooling a waxy oil in a cooling zone to a sufficiently low temperature to crystallize substantially all of the wax contained therein; passing the resulting slurry into a purification zone; separating the crystalline wax from said slurry so as to form a mass of wax crystals; withdrawing a wax-free oil from said purification zone; moving said mass of wax crystals through said purification zone into a melting zone therein; introducing a low boiling solvent into said melting zone at a temperature sufficiently high to melt at least a portion of said wax crystals; melting at least a portion of said wax crystals in said melting zone; displacing a portion of the resulting liquid comprising melted wax crystals and solvent as a reflux liquid countercurrently through said moving mass of wax crystals; withdrawing reflux liquid from said purification zone; passing said reflux liquid into a heat exchange zone; evaporating at least a portion of the solvent from said reflux liquid, thereby lowering the temperature of said liquid; passing waxy oil through said heat exchange zone in indirect heat exchange relation with said reflux liquid; introducing said waxy oil into said cooling zone; and recovering wax containing solvent from said downstream end crystalwise of said purification zone.

14. The process of claim 13 wherein said reflux liquid substantially free from solvent is recycled from said heat exchange zone to said cooling zone.

15. The process of claim 13 in which the low boiling solvent is propane.

16. A process for separating a component from a liquid multi-component mixture which comprises moving a mass of crystals essentially of said component, formed by said component upon cooling said mixture, downstream through a purification zone to a melting zone therein; passing a low boiling solvent into said melting zone in said purification zone at a temperature sufficient to melt at least a portion of said crystals therein; melting at least a portion of said crystals in said melting zone; passing at least a portion of the resulting liquid comprising melted crystals and solvent as a reflux liquid countercurrently through said moving mass of crystals; and recovering a product comprising said component containing solvent from the said melting zone.

17. A process for separating a component from a liquid multi-component mixture which comprises moving a mass of crystals essentially of said component, formed by said component upon cooling said mixture, downstream through a purification zone to a melting zone therein; passing a low boiling solvent into said melting zone in said purification zone at a temperature sufficient to melt at least a portion of said crystals therein; melting at least a portion of said crystals in said melting zone; passing at least a portion of the resulting liquid comprising melted crystals and solvent as a reflux liquid countercurrently through said moving mass of crystals; withdrawing reflux liquid from said purification zone upstream of said melting zone; passing said reflux liquid into a heat exchange zone; passing said mixture into said heat exchange zone; evaporating solvent in said heat exchange zone; and recovering a product comprising said component containing solvent from said melting zone.

References Cited in the file of this patent

UNITED STATES PATENTS

| | | |
|---|---|---|
| 2,287,966 | Brandt | June 30, 1942 |
| 2,301,965 | Mauro | Nov. 17, 1942 |
| 2,302,195 | Dons et al. | Nov. 17, 1942 |
| 2,315,762 | Ax et al. | Apr. 6, 1943 |
| 2,438,368 | Keeling | Mar. 23, 1948 |
| 2,540,083 | Arnold | Feb. 6, 1951 |
| 2,617,274 | Schmidt | Nov. 11, 1952 |
| 2,637,749 | Aston et al. | May 5, 1953 |
| 2,681,335 | Gorin | June 15, 1954 |
| 2,731,456 | Weedman | Jan. 17, 1956 |

UNITED STATES PATENT OFFICE
CERTIFICATE OF CORRECTION

Patent No. 2,882,215                      April 14, 1959

Glenn H. Dale

It is hereby certified that error appears in the printed specification of the above numbered patent requiring correction and that the said Letters Patent should read as corrected below.

Column 7, line 50, for "to distillation system" read -- to a distillation system --; column 9, line 38, for "filter", first occurrence, read -- first --.

Signed and sealed this 3rd day of November 1959.

(SEAL)
Attest:

KARL H. AXLINE
Attesting Officer

ROBERT C. WATSON
Commissioner of Patents